June 2, 1936.  E. B. KESTER  2,043,103
APPARATUS FOR EXTRACTING SUBSTANCES SUCH AS PHENOLIC MATERIALS
Filed Dec. 8, 1934  3 Sheets-Sheet 3
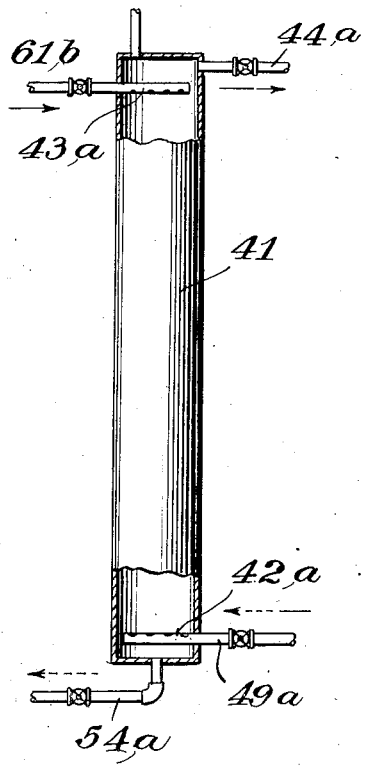
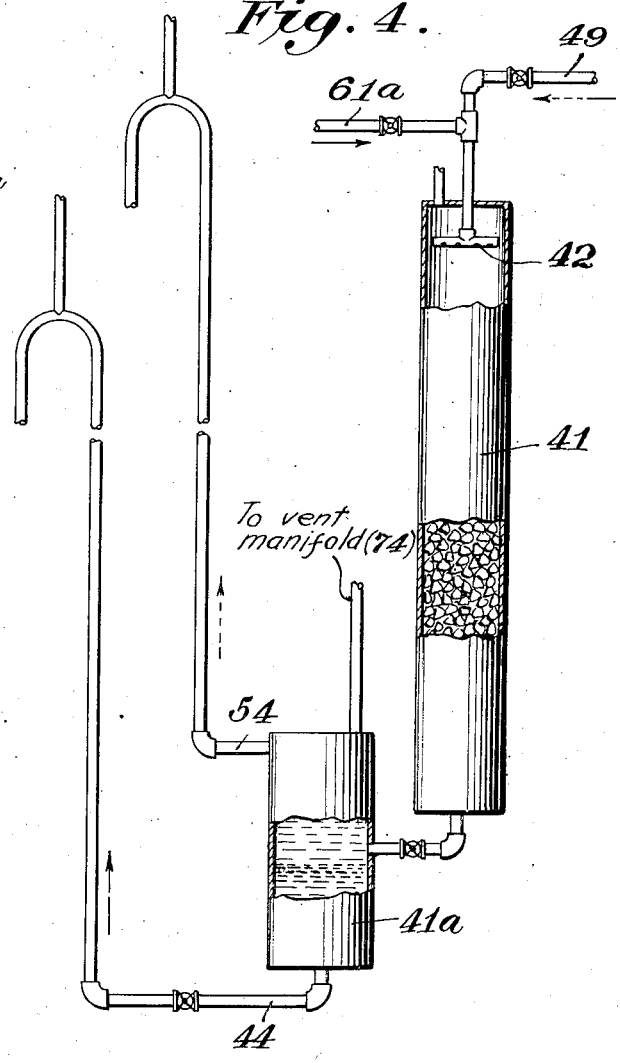

Patented June 2, 1936

2,043,103

UNITED STATES PATENT OFFICE 2,043,103

APPARATUS FOR EXTRACTING SUBSTANCES SUCH AS PHENOLIC MATERIALS

Ernest B. Kester, Pittsburgh, Pa., assignor, by mesne assignments, to Koppers Gas and Coke Company, a corporation of Delaware Application December 8, 1934, Serial No. 756,698

2 Claims. (Cl. 23—267)

This invention relates to improvements in apparatus for producing phenols or so-called tar acids, and more particularly to apparatus for the treatment of solutions of phenolates (tar acid salts) under such conditions that phenols may be efficiently and economically extracted from such solutions.

In the production of tar acids from coal tar, it has been customary to extract tar acids from the tar acid oil fraction by means of caustic soda solution and then to treat the resulting phenolate solution, separated from the unreacted oil, with a mineral acid or carbon dioxide gas to "spring" the phenols. The free phenols or tar acids, and the sodium carbonate solution formed when carbon dioxide is employed, are separated, and from the carbonate solution sodium hydroxide is regenerated for further use in the extraction process. If a mineral acid neutralization process is employed, the sodium is lost for further usefulness.

The regeneration of sodium hydroxide from sodium carbonate that is generally practiced in tar acid plants increases production costs to such an extent that the elimination of the caustic soda regeneration system has become a matter of considerable importance. As is well known, the sodium carbonate solution obtained in "springing" phenolates, is treated in causticizers with lime coming from a lime-kiln used for burning limestone and for generating carbon dioxide. The caustic soda solution from the causticizers must then be filtered to remove calcium carbonate before the solution is employed for extracting tar acids. The equipment, including "springing" tanks, causticizers, kilns, and filter presses, required in plants employing the above prior process, is relatively costly to install and to operate. The existing process is further encumbered by the necessity for disposing of the calcium carbonate from the causticizers.

In the present invention the use of carbon dioxide gas in the treatment of phenolates is avoided and therefore the equipment mentioned above is unnecessary. Alkaline solutions are employed to convert phenols into phenolates but the alkaline reagent is regenerated directly from the phenolate solution treated. No carbon dioxide or mineral acid is used for this purpose. The apparatus is so operated that losses of reagents employed are practically negligible. Moreover, all materials used are handled conveniently in the liquid or gaseous phases. No problem in waste disposal is involved.

The present invention comprises apparatus for bringing together a solvent and phenolate solution for the purpose of extracting phenols from the latter, and for separating the resulting solution of phenol material from regenerated alkaline material originally employed in combining with phenols present in tar or other oils. In this apparatus the phenolic material is separated from the solvent by fractional distillation and such solvent is reused in extracting additional phenolic material. The regenerated alkaline material is reused for the formation of phenolates from additional phenol-containing oils.

As will be seen, in the use of the present apparatus advantage is taken of the insolubility of the alkaline reagents employed, in certain liquid solvents (and vice versa), and of the tendency of phenolates to hydrolyze. An example of such hydrolysis may be represented by the equation:

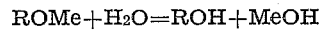

$$ROMe + H_2O = ROH + MeOH$$

wherein Me is a symbol for the positive radical of a base-forming material. It has been found that phenols are readily extractable by virtue of this hydrolysis from aqueous sodium hydroxide, for instance, by means of immiscible solvents such as ether or benzol to any attenuation desired. In a phenolate solution, such phenol as is formed due to hydrolysis is partitioned between the two liquid layers, namely between the aqueous phenolate solution and the immiscible solvent. In view of this, intimate contact of the liquids in an extraction chamber is exceedingly advantageous and tends towards improved extraction. As fresh solvent enters the extraction chamber, loaded solvent is separated from the mixture and removed from the chamber, to be recovered for recycling from the free phenolic material. Under these conditions the equilibrium represented by the above equation tends to be disturbed by the removal of one of the reactants, namely, the free phenolic material so that more of the latter is continuously formed until extraction is substantially complete.

Certain measures may be taken to increase the hydrolysis of phenolate solutions and to accelerate the rate of removal of phenolic material from caustic solutions:

(1) Increase in temperature in the extraction chamber promotes hydrolysis and has an accelerating effect on the removal of the phenols. On a volume basis, isopropyl ether for instance, is inferior to ethyl ether in the present process under the same conditions of temperature. An increase of temperature, however, accelerates the extraction so decidedly that the two ethers may be compared favorably close to their normal boiling points. The higher temperature permissible in the case of isopropyl ether (B. P. 69° C.) augments the power of this solvent until it is superior to ethyl ether on the mole basis at temperatures usable for each without resort to pressure equipment.

When the extraction is carried on at higher temperatures the temperature is preferably maintained below the boiling point of the solvent. Pressure may be used to raise the normal boiling point to obtain the advantage of increased temperature.

(2) Dilution of the phenolate solution to be treated, likewise promotes hydrolysis and has an accelerating effect on the removal of phenols, other conditions being equal. A phenolate solution of given concentration may be diluted to increase hydrolysis and in turn the rate of removal of phenols. For example, the use of a caustic strength of 2.5 normality results in a distinct advantage in speed of extraction over caustic of 5.0 normality. By the same token, the use of caustic of 1.5, 1.0, or 0.5 normality, results in increases in speed of extraction in the order of the decrease in normality.

Various solvents or combinations of solvents may be used in the present process. It is preferable to use what are herein termed immiscible solvents, namely, solvents that are, practically speaking, immiscible with the phenolate solution treated. Examples of immiscible solvents are benzene, toluene and ligroin. Besides immiscible solvents, partially miscible solvents may be used. Examples of partially miscible solvents are "hexone", ether, and isopropyl ether. The above solvents are used separately or in combinations of two or more. A solvent completely miscible with the phenolate may be used provided an immiscible or partially miscible solvent is used in conjunction with it that will yield a two-layer system. The solvent layer should be substantially free from the base-forming material at all times during the extraction.

In selecting a combination of solvents at least one should be either immiscible or only partially miscible. Combinations that are satisfactory are acetone and benzene; ether and toluene; isopropyl ether and toluene; ether, acetone and benzene.

The presence of an organic base in a solvent, renders it exceeding efficient. Pyridine, picolines or piperidine are suitable. In addition to the presence of these in the solvent, they may be also added to the phenolate to great advantage. When approximately one equivalent of an organic base was added to the phenolate solution and the same base was present to the extent of 50% in the solvent, excellent results were obtained. Any proportion of base may be used in either the phenolate solution or the solvent within practical limits.

It is known that organic bases form compounds or addition products with phenols, a fact which doubtless accounts for the greater readiness with which phenols are removed from caustic solutions in the presence of an organic base either as an adjunct to the phenolate solution, or as a constituent of the solvent or both.

Ordinarily it is more advantageous to employ solvents that have lower boiling points than any of the uncombined phenols extracted. It is possible, however, to employ solvents such as benzophenone (B. P. 306° C.) or dibenzyl ether (B. P. 295.8° C.) having boiling points higher than the boiling points of the phenols extracted.

The materials treated for the recovery of phenols are essentially hydrocarbon oils containing the same. The chief source of tar acids is coal tar from either high or low temperature carbonization. The tar acid oil fraction separated by distillation contains constituents having a boiling point range up to substantially 270° C. However a tar acid oil fraction having a higher end boiling point may be treated if desired.

Mineral oils are frequently treated with phenols to improve their properties. This is particularly true of lubricating oils. Phenolates produced by the recovery of phenols used in such processes may be treated in the apparatus of the present invention.

The strength of the caustic solution used in extracting tar acid oils should be such that a separation of the aqueous from the non-aqueous layer is readily obtained. Ordinarily a 9.5% solution is employed, in a tar acid plant. An excess of caustic over and above the amount required to neutralize the tar acids present in the oil, should be avoided as such excess tends to retard the subsequent extraction by solvents.

Other alkaline materials besides caustic soda solution may be employed in the extraction of phenols from oils. In general, alkali, alkaline earth, magnesium and ammonium hydroxides, and alkali sulfides may be used as alkaline materials.

The term "phenol" is used in its broad sense as distinguished from benzophenol, (carbolic acid, $C_6H_5OH$) and includes hydroxylated benzenoid substances in general. "Phenolate" is used to designate salts of the so-called phenols or phenols combined with the positive radical of a base.

Phenolic substances varying in structure and molecular weight are extractable from caustic solutions at different rates under identical conditions, the rates being specific for each chemical compound under the conditions used. Ortho substituted phenols, for instance, are more readily removed than are the corresponding meta- and para-compounds. Meta- and para-cresol behave substantially identically under the same conditions. Increase in molecular weight tends to increase the rapidity with which phenols may be removed from caustic solutions, but this effect may be mitigated or inhibited altogether by the influence of structure. The simple phenols such as benzophenol and the two naphthols are more difficult to extract from caustic solutions than are the alkyl substitution products of benzophenol.

The construction and arrangement of the parts of the apparatus will be readily understood from the description of the operation thereof. Reference is made to the accompanying drawings in which:

Figs. 3 and 4 are views, partly in elevation and partly in vertical section of modifications of a portion of the apparatus.

Figure 1:
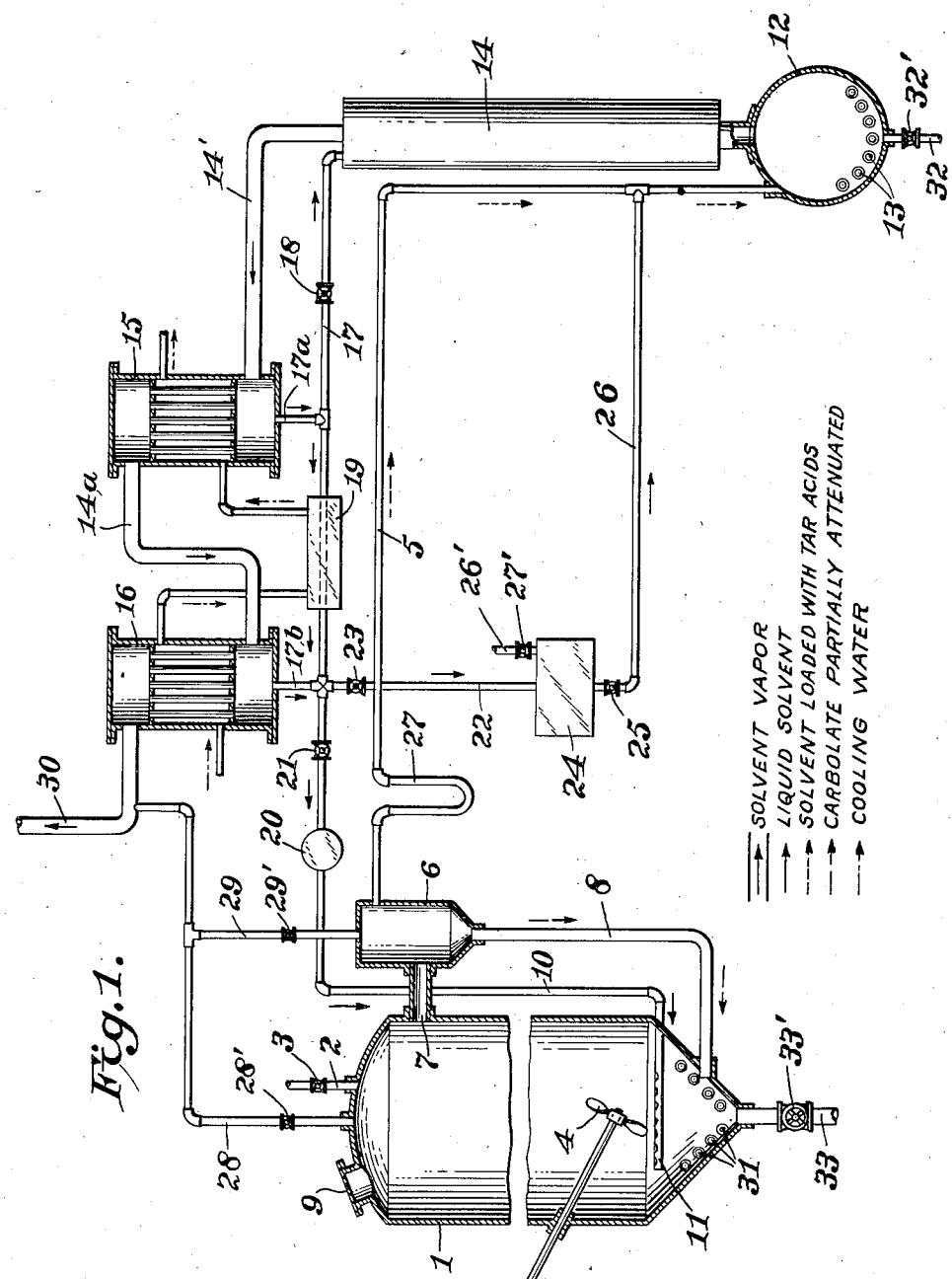
Fig. 1 is a view, partly in elevation and partly in vertical section, of one modification of apparatus suitable for the practice of my present invention.

A phenolate solution derived from the oil treatment processes described above is introduced into a vessel 1 (Fig. 1) through a pipe 2 provided with a valve 3. The upper level of the phenolate solution should preferably reach above the stirrer 4. The balance of the vessel is filled with solvent material, of the type mentioned above, until its upper level is as high as the overflow pipe 5 leading from the settling chamber 6 that is connected to an upper section of the vessel 1 by means of a pipe 7, and to a lower section by means of a pipe 8. The solvent may be initially introduced through a manhole 9 or any other suitable means. The stirrer 4 is rotated and fresh solvent is continuously introduced at the bottom of the vessel 1 through a pipe 10 provided at its end with any type of distributor means such as perforated pipe section 11 for injecting the solvent into the phenolate solution preferably in finely comminuted condition. During the extraction the solvent is supplied as a condensate from a still 12 used for separating the extracting medium from extracted phenolic material.

The still 12 is provided with any suitable heating means such as a steam coil 13 and with a fractionating column or rectifier 14. Vapors from the rectifier 14 pass through a conduit 14' into the partial and final condensers 15 and 16 respectively connected by a conduit 14a. The condensate from condenser 15 is drawn off through a pipe 17 and may be returned in whole or in part to the column 14 as reflux by opening a valve 18. Or, by closing the valve 18 the condensate from condenser 15 is led through a cooler 19 and is brought together with the condensate from condenser 16 and led to the vessel 1 through the pipe 10 and distributor 11. The cooler 19 may be arranged as shown, in series with the cooling system of the condensers 15 and 16. Pipes 17a and 17b form connections between pipe 17 and the condensing chambers of condensers 15 and 16 respectively.

The entire apparatus is so designed that fresh solvent at a controlled rate is delivered to and thoroughly agitated with the phenolate solution. The apparatus shown in Fig. 1 is substantially of the type used for laboratory research heretofore disclosed by me ("Industrial and Engineering Chemistry" vol. 24, pages 1121 to 1125, October, 1932) and from which has evolved the present form for use in production on a commercial scale The rate of flow is determined by means of a flow meter 20 and is controlled by a valve 21. Any suitable means may be provided to prevent flooding the condensers. Excess solvent condensate may be withdrawn from the circulatory system through a pipe 22 connected to pipe 10, by opening a valve 23. The pipe 22 leads to a reservoir tank 24 from whence solvent may be introduced into the system by opening a valve 25 in a pipe 26 leading to the still 12. An inlet pipe 26' provided with a valve 27' may be connected to the tank 24.

The solvent entering vessel 1 through the distributor 11 is thoroughly emulsified with the phenolate solution. If desired, agitation may be accomplished by injecting an inert gas into the body of liquid in place of using a mechanical stirrer, or, both means may be combined. Contact between the solvent and phenolate solution may be further improved by providing packing (not shown) in the vessel. This may be omitted, however. The packing when provided above the stirrer 4, also assists in breaking the emulsion as it rises in the vessel 1.

While solvent is being fed into vessel 1 at the bottom, the solution of phenolic material over- flows through pipe 7 into the settling chamber 6 and then through pipe 5 into the still 12. Any emulsion that rises and passes into chamber 6 where it is free from agitating influences, separates into layers, the attenuated phenolate solution settling to the bottom and flowing back into the vessel 1 through pipe 8. A trap 27 in pipe 5 insures one-way flow of liquid.

Vents 28 and 29 having valves 28' and 29' respectively are provided for vessel 1 and chamber 6 respectively. These should be open to the atmosphere preferably by way of a pipe connection to the vent 30 of the final condenser 16. If desired, a vacuum pump (not shown) may be connected to the vent 30. The precaution is taken to prevent carbon dioxide from entering the system. This is done by providing a soda lime chamber (not shown) in the line 30.

As stated above the extraction in vessel 1 is improved by increasing the temperature. For heating purposes a steam coil 31 is provided. By forcing solvent into vessel 1 under pressure and by hermetically sealing it, a super-atmospheric pressure is developed throughout, by means of which the normal boiling point of the solvent may be raised, thereby permitting the use of higher temperatures. Under these conditions a pressure-reducing valve may serve to release phenolic solution from settling chamber 6.

The speed of stirring is maintained at a rate sufficient to ensure intimate mixture of the two liquids and to permit complete separation in settling chamber 6 of the emulsion formed.

At suitable intervals, the extracted phenol material is withdrawn from the still 12 through a draw-off pipe 32 provided with a valve 32'. If desired, the solvent may be removed from the extracted phenol in the still 12 or it may be removed in a separate distillation apparatus. To accomplish removal of solvent in still 12 the valves 21 and 25 may be temporarily closed and valve 23 opened. Reflux to improve fractionation is obtained by control of valve 18.

Attenuated phenolate solution (or regenerated caustic solution) is withdrawn from the vessel 1 through a drain pipe 33 provided with a valve 33'. Before withdrawal, valve 21 is closed, agitation stopped, and the regenerated caustic solution permitted to settle. The caustic solution withdrawn is used for extraction of fresh tar acid oils.

The apparatus shown in Fig. 1 is designed primarily for batch extraction in which single or multiple solvents may be employed. The series condensers 15 and 16 provide for proper cooling and condensation of vapors in cases where a plurality of solvents are employed having different boiling points.

Figure 2:
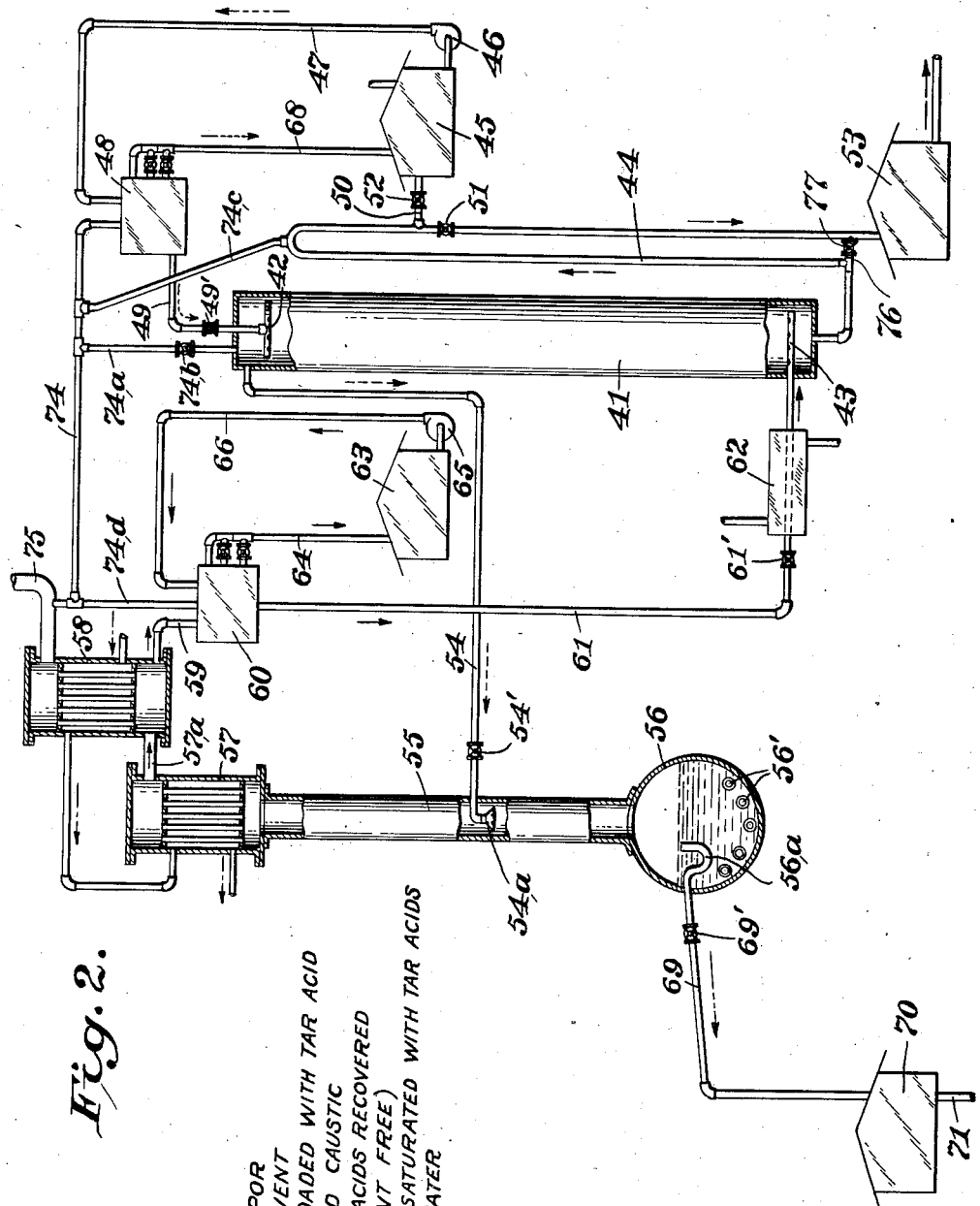
Fig. 2 is a view, partly in elevation and partly in vertical section, of another modification of the apparatus.

An example of apparatus that may be used in carrying on continuous extraction with countercurrent flow is illustrated in Fig. 2.

A tower 41 preferably tall and narrow, provided either with or without packing, or baffles or bell trays, is charged with solvent that enters through a perforated pipe 43 positioned in the lower portion of the tower. The upper level of the solvent is kept above a perforated pipe 42 through which phenolate solution is introduced into the upper portion of the tower. The phenolate solution in passing downwardly through the column of solvent, becomes attenuated with respect to phenolic material while the upward rising solvent becomes more highly charged therewith. The more concentrated phenol solution comes into contact with the more highly concentrated phenolate solution entering through pipe 42, and the fresh solvent entering through pipe 43 comes into contact with the less concentrated phenolate solution in the lower portion of the column. Attenuated phenolate solution is withdrawn from the bottom of the tower 41 through the seal 44 or other means for maintaining a level of phenolate solution below pipe 43.

Phenolate solution to be treated with solvent is pumped from a storage tank 45 by means of a pump 46 through a pipe 47 into a constant head feed tank 48. From the feed tank, the phenolate solution flows through a pipe 49 and a valve 49' to the perforated pipe 42. Phenolate solution that is not sufficiently attenuated is withdrawn from the pipe 44 through a pipe 50 leading to the storage tank 45. By keeping the valve 51 shut and the valve 52 open the phenolate solution may be repeatedly circulated through the tower 41, or if desired, the partially attenuated phenolate solution may be passed into a second tower similar to 41 for further extraction. Regenerated alkaline solution is passed to a storage tank 53 by opening valve 51. From the storage tank the regenerated alkaline solution is piped to the tar acid oil treating plant (not shown).

The solution of phenolic material in solvent is withdrawn from the tower 41 adjacent the top thereof, preferably above the level of the perforated pipe 42, through a pipe 54 provided with a valve 54'. The phenol solution is now treated to recover the solvent therefrom for reuse in the extracting tower. The phenol solution is sprayed through a spray device 54a into a fractionating column 55 on a still 56 provided with a heating means 56'. The solvent vapors rise through the dephlegmator 57 and pass through a pipe 57a into a final condenser 58. Condensed solvent passes from the condenser 58 through a pipe 59 into a constant head feed tank 60 from whence it is conducted through a pipe 61 and a valve 61' to the perforated pipe 43 in the extracting tower 41. Extraction is improved by preheating the solvent in a preheater 62. The solvent is preferably heated no higher than its normal boiling point unless provision is made for the use of pressure.

The rates of feed of solvent and of phenolate solution are controlled or maintained constant by means of the constant head feed tanks 60 and 48 respectively. To increase the rate of feed, the level of overflow of solvent in tank 60 is raised by closing valves in the take-offs at various levels in the side of the tank. To decrease the rate, valves in the take-offs are opened to permit overflow at a lower level into the solvent storage tank 63 through a pipe 64. The tank 60 is kept supplied with solvent from the condenser 58, and from tank 63 by means of a pump 65 pumping solvent through a return-pipe 66. The constant head feed tank 48 is operated in a manner similar to that of operating tank 60. In other words, the phenolate solution in tank 48 overflows at the desired level into tank 45 through a pipe 68 and is pumped back through pipe 47.

The phenol overflows from the still 56 through a pipe 69 and a valve 69' into a storage tank 70 from which it may be removed through line 71 to a refining plant. The end of the pipe 69 extending into the still may be provided with a trap 56a.

A vent manifold 74 is connected to the tank 48, the tower 41 by a pipe 74a having a valve 74b, the upper bend of the pipe 44 by a pipe 74c, and the tank 60 by a pipe 74d. The manifold 74 leads to the vent 75 on the condenser 58. Vent 75 may be opened to the atmosphere or connected to a vacuum pump (not shown); but preferably the vent is connected to a soda lime chamber (not shown) to remove carbon dioxide from air that is likely to gain access into the extraction apparatus.

The apparatus shown in Fig. 2 can be readily converted into a unit for batch treatment of phenolate as distinguished from a continuous circulation system. For instance, phenolate may be introduced directly from the tar acid oil treating plant into the top of the tower 41 through the pipe 49. A pipe 76 is provided which connects the lower end of the seal 44 directly with the tank 53. By closing valves 77, 51, and 52, a static body of phenolate may be maintained in the tower while passing a solvent upwardly therethrough in finely comminuted form. The phenol solution overflows into the still 56 through the pipe 54 in the manner described above. After sufficient extraction has taken place, the attenuated phenolate is withdrawn by opening the valve 77. Another batch of phenolate may then be introduced through the pipe 49. The circulation of phenolate through pipes 68 and 47 is in this instance not necessary, the phenolate merely being pumped to the tank 48 to pass it to the tower 41 when filling the latter.

Should a solvent of greater density than the phenolate be used, proper changes in pipe connections must be made that will introduce the solvent at the top of the tower and the phenolate at the bottom, the phenol solution being withdrawn from the bottom and the attenuated phenolate from the top. This is illustrated in Fig. 3 in which is shown a pipe 61b for feeding solvent to a perforated pipe 43a in the column 41, a pipe 49a for feeding phenolate to a perforated pipe 42a, a pipe 54a for withdrawing phenol solution, and a pipe 44a for withdrawing attenuated phenolate.

With proper reconstruction, towers of the type shown in Fig. 2 may be adapted to processes in which solvent and phenolate solution are passed through concurrently instead of countercurrently. In this instance as shown in Fig. 4, the solvent may, if desired, be led through a pipe 61a into the perforated pipe 42 along with the phenolate solution passing through the pipe 49 at the top of the tower 41. The attenuated mixture enters the settling chamber 41a from which the phenolate is withdrawn through the pipe 44, and the phenol solution is withdrawn through the pipe 54. Distances between the overflow levels in the two pipes 54 and 44 should be approximately commensurate with the differences in the specific gravities of the two separated liquids.

Instead of single towers for the extraction of phenols from phenolate, a plurality or battery of towers may be employed, with fresh solvent entering tower 1, for instance, charged with most highly attenuated carbolate, proceeding thence through the battery to tower $n$ charged with fresh carbolate. When the carbolate in tower 1 is sufficiently spent, it is cut off from the train, fresh solvent now entering tower 2 and leaving from freshly charged tower $n+1$ and so on.

In the illustrations given above, the apparatus may be so operated that a phenolate in finely comminuted form is passed through a static body or moving body of solvent as distinguished from passing solvent through a static or moving body of phenolate.

Phenolate solutions derived from tar oils may be subjected to a preliminary purification before placing in the extraction chamber. Benzene or steam, for instance, may be used to remove any non-phenolic substances present in such phenolate solutions.

This application is a continuation in part of application Serial No. 717,523, filed March 26, 1934.

It is thought that the invention and many of its attendant advantages will be understood from the foregoing description and accompanying drawings, and it will be apparent that various changes may be made in the form, construction and arrangement of parts without departing from the spirit and scope of the invention or sacrificing all of its material advantages, the forms hereinbefore cited by way of illustration being merely the preferred embodiments thereof.

What I claim is:—

1. Apparatus for extracting substances by means of a fluid solvent, the said apparatus comprising a vessel, circulatory means including means adapted to withdraw liquid material from one level in the vessel and including return means adapted to reintroduce a portion of the said liquid material at another level in the said vessel, heating means for the said vessel adjacent the said second level, the said return means being positioned to introduce the liquid material into the said vessel in heat exchange relation with the said heating means, an enlarged chamber in the said circulatory means, means for separately withdrawing liquid from an upper level in the said chamber, and distributing means within the said vessel for separately introducing fluid in finely divided form.

2. Apparatus for extracting substances by means of a fluid solvent, the said apparatus comprising a vessel, circulatory means adjacent the said vessel for continuous recirculation of liquid, the said circulatory means including means adapted to withdraw liquid material from one level in the vessel and including return means adapted to reintroduce at least a portion of the said liquid material at another level in the said vessel, heating means for the said vessel adjacent the said second level, the said return means being positioned to introduce the returned liquid into the said vessel in heat exchange relation with the said heating means, and means for separately introducing fluid into the said vessel.

ERNEST B. KESTER.